US009736880B2

(12) United States Patent
Kwon et al.

(10) Patent No.: US 9,736,880 B2
(45) Date of Patent: Aug. 15, 2017

(54) METHOD AND APPARATUS FOR PERFORMING POWER CONTROL BY TERMINAL IN WIRELESS COMMUNICATION SYSTEM USING MULTIPLE CARRIERS

(71) Applicant: LG ELECTRONICS INC., Seoul (KR)

(72) Inventors: Yeong Hyeon Kwon, Anyang-si (KR); So Yeon Kim, Anyang-si (KR); Sung Ho Moon, Anyang-si (KR); Jae Hoon Chung, Anyang-si (KR); Seung Hee Han, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/983,100

(22) Filed: Dec. 29, 2015

(65) Prior Publication Data
US 2016/0135091 A1    May 12, 2016

Related U.S. Application Data

(63) Continuation of application No. 13/509,969, filed as application No. PCT/KR2010/008040 on Nov. 15, 2010, now Pat. No. 9,237,596.
(Continued)

(51) Int. Cl.
*H04W 76/04* (2009.01)
*H04L 1/18* (2006.01)
(Continued)

(52) U.S. Cl.
CPC ......... *H04W 76/046* (2013.01); *H04L 1/1812* (2013.01); *H04L 1/1861* (2013.01);
(Continued)

(58) Field of Classification Search
None
See application file for complete search history.

(56) References Cited

U.S. PATENT DOCUMENTS 8,359,039 B2  1/2013  McBeath et al.
8,514,793 B2  8/2013  Gauvreau et al.
(Continued)

FOREIGN PATENT DOCUMENTS

KR  10-2008-0065880 A  7/2008
KR  10-2008-0073616 A  8/2008
(Continued)

OTHER PUBLICATIONS

Ericsson, et al., "Activation and deactivation of component carriers", 3GPP TSG-RAN WG2 #68, Tdoc R2-096752, Jeju, Korea, Oct. 9-13, 2009, pp. 1-4.
(Continued)

*Primary Examiner* — Hassan Kizou
*Assistant Examiner* — Hashim Bhatti
(74) *Attorney, Agent, or Firm* — Birch, Stewart, Kolasch & Birch, LLP

(57) ABSTRACT

A method of activating or deactivating frequency resources at a terminal configured with a primary frequency resource and one or more non-primary frequency resources in a wireless communication system, and the terminal are discussed. The method according to one embodiment includes receiving a medium access control (MAC) signal for activating the one or more non-primary frequency resources; activating the one or more non-primary frequency resources; and deactivating the one or more non-primary frequency resources on expiry of a specific time period configured by radio resource control (RRC) signaling, the specific time period being for which of the one or more non-primary frequency resources are activated.

8 Claims, 13 Drawing Sheets

Related U.S. Application Data

(60) Provisional application No. 61/261,371, filed on Nov. 15, 2009.

(51) Int. Cl.
*H04L 5/00* (2006.01)
*H04L 27/26* (2006.01)
*H04W 52/44* (2009.01)
*H04W 52/02* (2009.01)
*H04W 72/04* (2009.01)
*H04W 88/02* (2009.01)
*H04W 88/08* (2009.01)

(52) U.S. Cl.
CPC .......... *H04L 1/1864* (2013.01); *H04L 5/0007* (2013.01); *H04L 5/0053* (2013.01); *H04L 27/2601* (2013.01); *H04W 52/0216* (2013.01); *H04W 52/44* (2013.01); *H04W 72/0453* (2013.01); *H04W 76/048* (2013.01); *H04L 1/1893* (2013.01); *H04W 88/02* (2013.01); *H04W 88/08* (2013.01); *Y02B 60/50* (2013.01)

(56) References Cited

U.S. PATENT DOCUMENTS

| | | |
|---|---|---|
| 2008/0186892 A1 | 8/2008 | Damnjanovic |
| 2009/0055703 A1 | 2/2009 | Kim et al. |
| 2009/0257387 A1* | 10/2009 | Gholmieh ............ H04L 5/0053 370/329 |
| 2010/0098012 A1 | 4/2010 | Bala et al. |
| 2010/0227569 A1* | 9/2010 | Bala ...................... H04L 5/0007 455/73 |
| 2011/0002281 A1* | 1/2011 | Terry ................ H04W 52/0216 370/329 |
| 2012/0176950 A1* | 7/2012 | Zhang .................... H04L 5/001 370/311 |

FOREIGN PATENT DOCUMENTS

| | | |
|---|---|---|
| KR | 10-2009-0019662 A | 2/2009 |
| WO | WO 2007/024098 A1 | 3/2007 |

OTHER PUBLICATIONS

Ericsson, et al., "DRX with Carrier Aggregation", 3GPP TSG-RAN WG2 #68, Tdoc R2-096751, Jeju, Korea, Oct. 9-13, 2009, pp. 1-5.

* cited by examiner

METHOD AND APPARATUS FOR PERFORMING POWER CONTROL BY TERMINAL IN WIRELESS COMMUNICATION SYSTEM USING MULTIPLE CARRIERS

CROSS-REFERENCE TO RELATED APPLICATIONS

This application is a Continuation of copending application Ser. No. 13/509,969, filed on May 15, 2012, which is the National Phase of PCT/KR2010/008040, filed on Nov. 15, 2010, which claims priority under 35 U.S.C. §119(e) to U.S. Provisional Application No. 61/261,371, filed on Nov. 15, 2009, all of which are hereby expressly incorporated by reference into the present application.

BACKGROUND OF THE INVENTION

Field of the Invention

The present invention relates to a wireless communication system using multiple carriers, and more particularly to a method and apparatus for allowing a user equipment (UE) belonging to a wireless communication system to perform power control during the carrier reception of the UE.

Discussion of the Related Art

Wireless communication systems have been widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used. For example, a Code Division Multiple Access (CDMA) system, a Frequency Division Multiple Access (FDMA) system, a Time Division Multiple Access (TDMA) system an Orthogonal Frequency Division Multiple Access (OFDMA) system, a Single Carrier Frequency-Division Multiple Access (SC-FDMA) system, a Multi-Carrier Frequency Division Multiple Access (MC-FDMA) system, and the like. In a mobile communication system, a user equipment (UE) may receive information from a base station (BS) via downlink, and may transmit information to the base station (BS) via uplink. The information that is transmitted and received to and from the UE includes data and a variety of control information. A variety of physical channels are used according to categories and usages of transmission (Tx) and reception (Rx) information of the UE.

In a mobile wireless communication system, a channel is not constant between a transmitter and a receiver. Thus, it is necessary to often measure the channel between a transmission (Tx) antenna and a reception (Rx) antenna. When a predefined signal is transmitted and received to measure the channel, the receiver may determine the amplitude decrease and phase shift of the channel using the predefined signal and may feed back the determined information to the transmitter. In addition, the receiver may detect and decode data information reliably based on the determined information. The signal predefined between the transmitter and the receiver may be referred to as a reference signal, a pilot signal, or a sounding reference signal (SRS).

As a representative example of a wireless communication system of the present invention, a $3^{rd}$ Generation Partnership Project Long Term Evolution (3GPP LTE) communication system will hereinafter be described in detail.

FIG. 1 is a conceptual diagram illustrating an Evolved Universal Mobile Telecommunications System (E-UMTS) network structure as an exemplary mobile communication system. In particular, the Enhanced Universal Mobile Telecommunications System (E-UMTS) has evolved from a legacy UMTS system, and basic standardization thereof is now being conducted by the 3rd Generation Partnership Project (3GPP). E-UMTS may also be referred to as Long Term Evolution (LTE). For details of the technical specifications of UMTS and E-UMTS, refer to Release 7 and Release 8 of "3rd Generation Partnership Project; Technical Specification Group Radio Access Network".

As shown in FIG. 1, the E-UMTS system is broadly made up of a User Equipment (UE) 120, base stations (or eNode-Bs) 110*a* and 110*b*, and an Access Gateway (AG) which is located at an end of a network (E-UTRAN) and is connected to an external network. Generally, an eNode-B can simultaneously transmit multiple data streams for a broadcast service, a multicast service and/or a unicast service.

Each eNode-B includes one or more cells. One cell of the eNode-B is set to use a bandwidth such as 1.25, 2.5, 5, 10, 15 or 20 MHz to provide a downlink or uplink transmission service to user equipments (UEs). Here, different cells may be set to use different bandwidths. The eNode-B controls transmission and reception of data for several UEs. In association with downlink (DL) data, the eNode-B transmits downlink (DL) scheduling information to a corresponding UE, so as to inform the corresponding UE of time/frequency domains where data is to be transmitted, coding information, data size information, Hybrid Automatic Repeat and reQuest (HARQ)—related information, and the like. In association with uplink (UL) data, the eNode-B transmits UL scheduling information to the corresponding UE, so that it informs the corresponding UE of time/frequency domains capable of being used by the corresponding UE, coding information, data size information, HARQ-related information, and the like. An interface for transmission of user traffic or control traffic may be used between eNode-Bs. A Core Network (CN) may include an Access Gateway (AG) and a network node for user registration of the UE. The AG manages mobility of a UE on the basis of a Tracking Area (TA) composed of several cells.

Although wireless communication technology has been developed to LTE technology on the basis of WCDMA technology, users and enterprises continuously demand new feature and services. In addition, other wireless access technologies are being developed, such that there is a need for new or improved wireless access technology in order to remain competitive in the long run. For example, reduction in cost per bit, increase of service availability, adaptive frequency band utilization, a simple structure, an open-type interface, and appropriate user equipment (UE) power consumption are needed for the new or improved wireless access technology.

Recently, 3GPP has been establishing a standard task for a subsequent technique of LTE. In this specification, such a technique is referred to as "LTE-Advanced" or "LTE-A". One of the main differences between an LTE system and an LTE-A system is a system bandwidth. The LTE-A system is aimed at supporting a broadband of a maximum of 100 MHz, and to this end, the LTE-A system is designed to use a carrier aggregation or bandwidth aggregation technique using a plurality of frequency blocks. Carrier aggregation employs a plurality of frequency blocks as one big logical frequency band in order to use a wider frequency band. A bandwidth of each frequency block may be defined based on a bandwidth of a system block used in the LTE system. Each frequency block is transmitted using a component carrier.

Multiple carriers may also be referred to as carrier aggregation or bandwidth aggregation.

SUMMARY OF THE INVENTION

Accordingly, the present invention is directed to a method and apparatus for performing power control by a user equipment (UE) in a wireless communication system using multiple carriers that substantially obviate one or more problems due to limitations and disadvantages of the related art. An object of the present invention is to provide a method and apparatus for allowing a user equipment (UE) belonging to a wireless communication system based on multiple carriers to perform power control during the carrier reception of the UE.

It is to be understood that technical objects to be achieved by the present invention are not limited to the aforementioned technical objects and other technical objects which are not mentioned herein will be apparent from the following description to one of ordinary skill in the art to which the present invention pertains.

The object of the present invention can be achieved by providing a user equipment (UE) for use in a wireless communication system supporting multiple carriers, the user equipment (UE) including a reception module for receiving control information, that indicates whether a multi-carrier operation is performed using a hybrid automatic repeat request (HARQ) process, from a base station (BS); and a processor for performing a multi-carrier reception operation in a specific period in which a specific HARQ process indicated by the control information is activated.

The control information may indicate the presence or absence of an independent multi-carrier mode for each HARQ process.

The control information may include a single control signal indicating the presence or absence of a multi-carrier mode for at least two HARQ processes.

The control information may be achieved by applying cross-carrier scheduling to at least one control signal of several HARQ processes operated in a multi-carrier mode, and may be received through a single common carrier.

In another aspect of the present invention, a user equipment (UE) for use in a wireless communication system supporting multiple carriers includes a reception module for receiving first control information, that includes information regarding an activation time point established for each carrier, from a base station (BS); and a processor for maintaining a deactivation state, and controlling a power state so as to receive the multiple carriers at an activation time point indicated by the first control information.

Upon receiving second control information related to a discontinuous reception (DRX) mode setup through the reception module, the processor for controlling the power state may be operated in the discontinuous reception (DRX) mode according to the second control information, and at the same time receive multiple carriers transmitted at an activation time point indicated by the first control information.

In another aspect of the present invention, a user equipment (UE) for use in a wireless communication system supporting multiple carriers includes a reception module for receiving control information regarding a valid period in which carrier aggregation is activated, from the base station (BS); and a processor for controlling a power state in such a manner that the UE is operated in a multi-carrier reception mode from among the valid period indicated by the control information.

Control information regarding the valid period may be determined on the basis of specific information indicating whether the amount of data received from the base station (BS) satisfies a predetermined reference amount.

In another aspect of the present invention, a method for receiving control information by a user equipment (UE) in a wireless communication system supporting multiple carriers includes receiving control information, that indicates whether a multi-carrier operation is performed using a hybrid automatic repeat request (HARQ) process, from a base station (BS); and entering a multi-carrier reception mode in a specific period in which a specific HARQ process indicated by the control information is activated, thereby receiving multiple carriers from the base station (BS).

In another aspect of the present invention, a method for receiving control information by a user equipment (UE) in a wireless communication system supporting multiple carriers includes receiving first control information, that includes information regarding an activation time point established for each carrier, from a base station (BS); and controlling a power state in a deactivation state, thereby receiving the multiple carriers at an activation time point indicated by the first control information.

In yet another aspect of the present invention, a method for receiving control information by a user equipment (UE) in a wireless communication system supporting multiple carriers includes receiving control information regarding a valid period in which carrier aggregation is activated, from the base station (BS); and performing a multi-carrier reception mode in the valid period indicated by the control information, and receiving the multiple carriers from the base station (BS).

Those skilled in the art will appreciate that the exemplary embodiments of the present invention are merely part of preferred embodiments of the present invention and various embodiments of the present invention reflecting the technical features of the present invention can be derived and understood from the following detailed description of the present invention.

As is apparent from the above description, exemplary embodiments of the present invention have the following effects. In a wireless communication system using multiple carriers, a UE can perform power control when receiving the multiple carriers.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention, illustrate embodiments of the invention and together with the description serve to explain the principle of the invention. In the drawings.

DETAILED DESCRIPTION OF THE INVENTION

Figure 1:
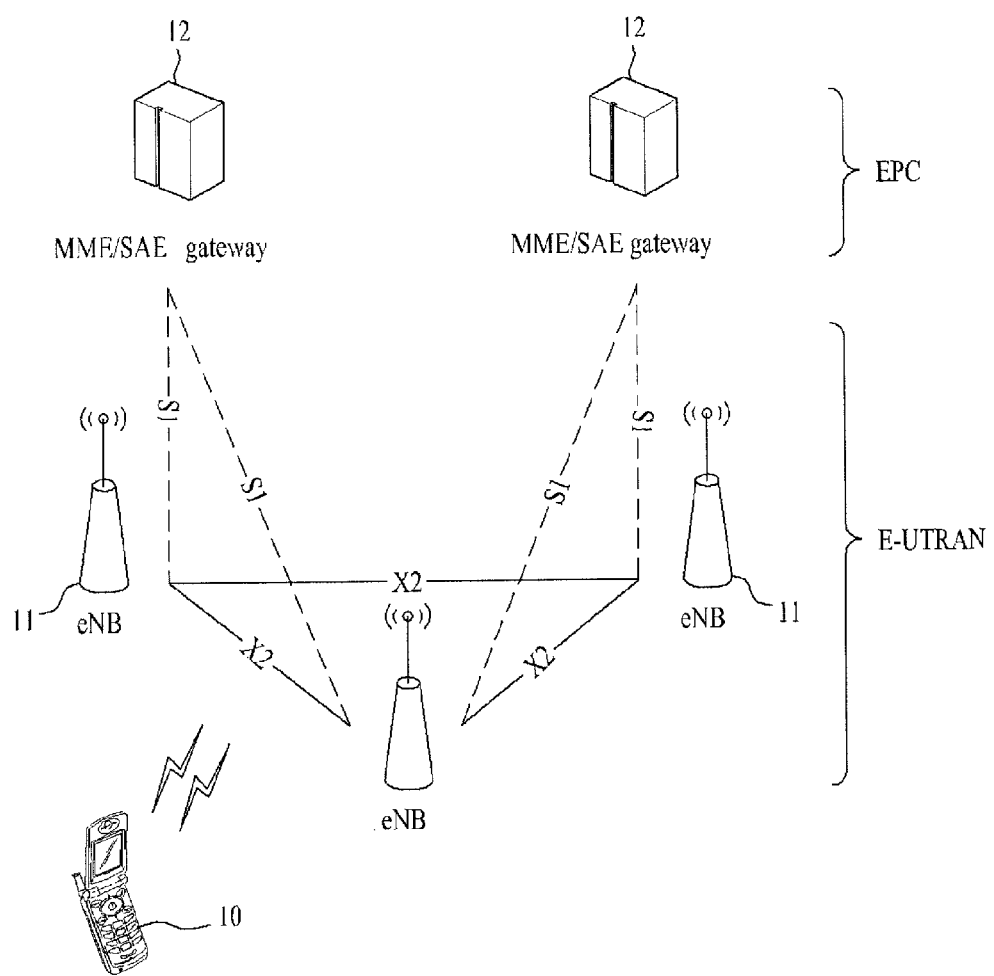
FIG. 1 is a conceptual diagram illustrating an Evolved Universal Mobile Telecommunications System (E-UMTS) network structure as an example of a wireless communication system.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details. For example, the following description will be given centering upon a mobile communication system serving as a 3GPP LTE system, but the present invention is not limited thereto and the remaining parts of the present invention other than unique characteristics of the 3GPP LTE system are applicable to other mobile communication systems.

In some cases, in order to prevent ambiguity of the concepts of the present invention, conventional devices or apparatuses well known to those skilled in the art will be omitted and be denoted in the form of a block diagram on the basis of important functions of the present invention. Wherever possible, the same reference numbers will be used throughout the drawings to refer to the same or like parts.

In the following description, a terminal may refer to a mobile or fixed user equipment (UE), for example, a user equipment (UE), a mobile station (MS) and the like. Also, the base station (BS) may refer to an arbitrary node of a network end which communicates with the above terminal, and may include an eNode B (eNB), a Node B (Node-B), an access point (AP) and the like.

The following embodiments of the present invention can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA can be implemented by wireless communication technologies, such as Universal Terrestrial Radio Access (UTRA) or CDMA2000. TDMA can be implemented by wireless communication technologies, for example, a Global System for Mobile communications (GSM), a General Packet Radio Service (GPRS), an Enhanced Data rates for GSM Evolution (EDGE), etc. OFDMA can be implemented by wireless communication technologies, for example, IEEE 802.11 (Wi-Fi), IEEE 802.16 (WiMAX), IEEE 802.20, E-UTRA (Evolved UTRA), and the like. UTRA is a part of a Universal Mobile Telecommunications System (UMTS). 3rd Generation Partnership Project (3GPP) Long Term Evolution (LTE) is a part of an Evolved UMTS (E-UMTS) that uses an E-UTRA. LTE-Advanced (LTE-A) is an evolved version of 3GPP LTE.

Although the following embodiments of the present invention will hereinafter describe inventive technical characteristics on the basis of the 3GPP LTE/LTE-A system, it should be noted that the following embodiments will be disclosed only for illustrative purposes and the scope and spirit of the present invention are not limited thereto.

In a mobile communication system, the UE may receive information from the base station (BS) via a downlink, and may transmit information via an uplink. The information that is transmitted and received to and from the UE includes data and a variety of control information. A variety of physical channels are used according to categories of transmission (Tx) and reception (Rx) information of the UE.

Figure 2:
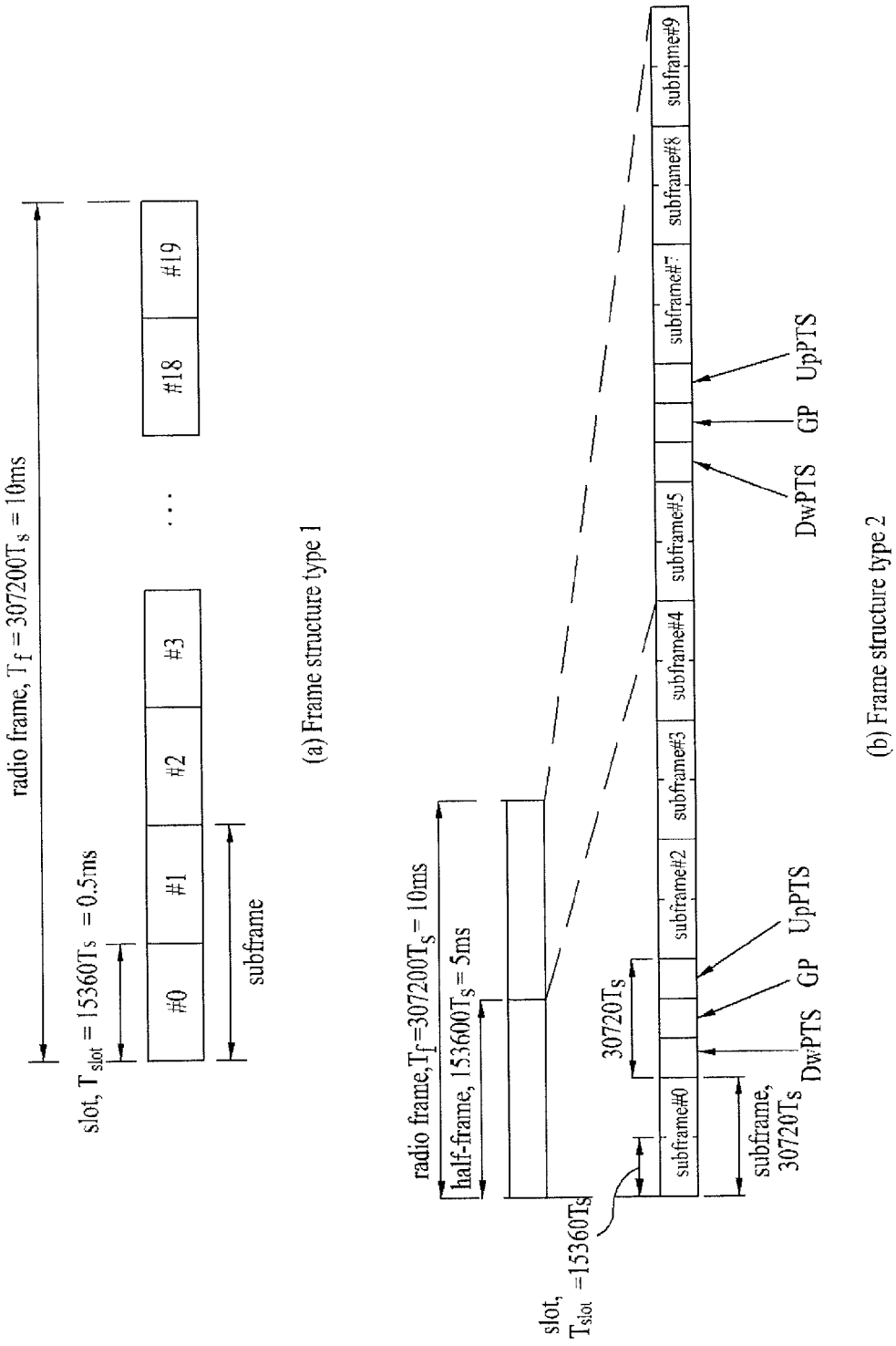
FIG. 2 is a diagram illustrating a structure of a radio frame used in a 3GPP LTE system.

FIG. 2 exemplarily shows a radio frame structure for use in a 3rd Generation Partnership Project Long Term Evolution (3GPP LTE) system.

Referring to FIG. 2, the radio frame has a length of 10 ms (327200·$T_s$) and includes 10 subframes of equal size. Each subframe has a length of 1 ms and includes two slots. In this case, $T_s$ represents sampling time, and is expressed by '$T_s=1/(15 \text{ kHz} \times 2048)=3.2552 \times 10^{-8}$ (about 33 ns)'. The slot includes a plurality of OFDM symbols in a time domain, and includes a plurality of resource blocks (RBs) in a frequency domain. In the LTE system, one resource block includes twelve (12) subcarriers×seven (or six) OFDM (Orthogonal Frequency Division Multiplexing) symbols. A frame structure type 1 is used for FDD, and a frame structure type 2 is used for TDD. The frame structure type 2 includes two half frames, and each half frame includes 5 subframes, a downlink piloting time slot (DwPTS), a guard period (GP), and an uplink piloting time slot (UpPTS). The aforementioned structure of the radio frame is only exemplary, and various modifications can be made to the number of subframes contained in the radio frame or the number of slots contained in each subframe, or the number of OFDM (or SC-FDMA) symbols in each slot.

Figure 3:
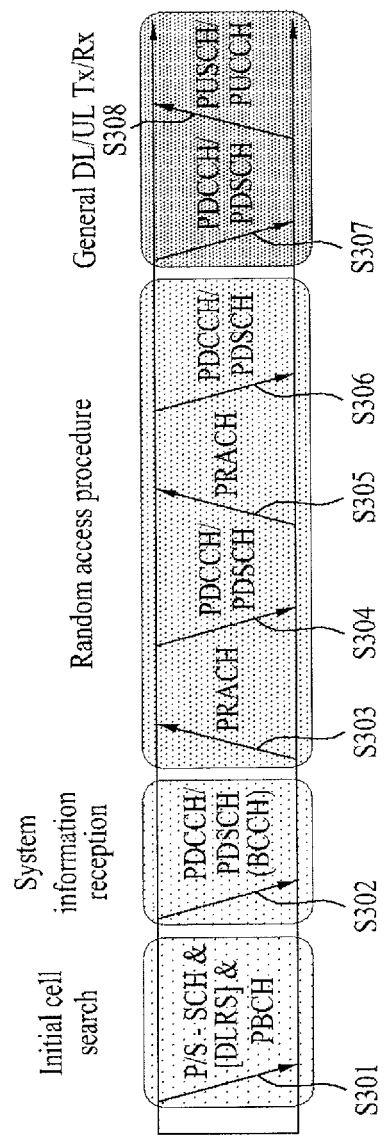
FIG. 3 is a conceptual diagram illustrating physical channels for use in a 3GPP LTE system and a method for transmitting a signal using the physical channels.

FIG. 3 is a conceptual diagram illustrating physical channels for use in a 3GPP system and a general method for transmitting a signal using the physical channels.

Referring to FIG. 3, when powered on or when entering a new cell, a UE performs initial cell search in step S301. The initial cell search involves synchronization with a BS. Specifically, the UE synchronizes with the BS and acquires a cell Identifier (ID) and other information by receiving a Primary Synchronization CHannel (P-SCH) and a Secondary Synchronization CHannel (S-SCH) from the BS. Then the UE may acquire information broadcast in the cell by receiving a Physical Broadcast CHannel (PBCH) from the BS. During the initial cell search, the MS may monitor a downlink channel status by receiving a downlink Reference Signal (DL RS).

After the initial cell search, the UE may acquire more specific system information by receiving a Physical Downlink Control CHannel (PDCCH) and receiving a Physical Downlink Shared CHannel (PDSCH) based on information of the PDCCH in step S302.

On the other hand, if the UE initially accesses the BS or if the UE does not have radio resources for signal transmission, it may perform a random access procedure to the BS in steps S303 to S306. For the random access, the UE may transmit a predetermined sequence as a preamble to the BS on a Physical Random Access CHannel (PRACH) in steps S303 and S305 and receive a response message for the random access on a PDCCH and a PDSCH corresponding to the PDCCH in steps S304 and S306. In the case of contention-based RACH, the UE may perform a contention resolution procedure.

After the foregoing procedure, the UE may receive a PDCCH and a PDSCH in step S307 and transmit a Physical Uplink Shared CHannel (PUSCH) and a Physical Uplink Control CHannel (PUCCH) in step S308, as a general downlink/uplink (DL/UL) signal transmission procedure. On the other hand, uplink control information transmitted from the UE to the BS or downlink control information transmitted from the UE to the BS may include a downlink (DL) or uplink (UL) ACKnowledgement/Negative ACKnowledgment (ACK/NACK) signal, a Channel Quality Indicator (CQI), a Precoding Matrix Index (PMI) and/or a Rank Indicator (RI). The UE adapted to operate in the 3GPP LTE system may transmit the control information such as a CQI, a PMI, and/or an RI on the PUSCH and/or the PUCCH.

Figure 4:
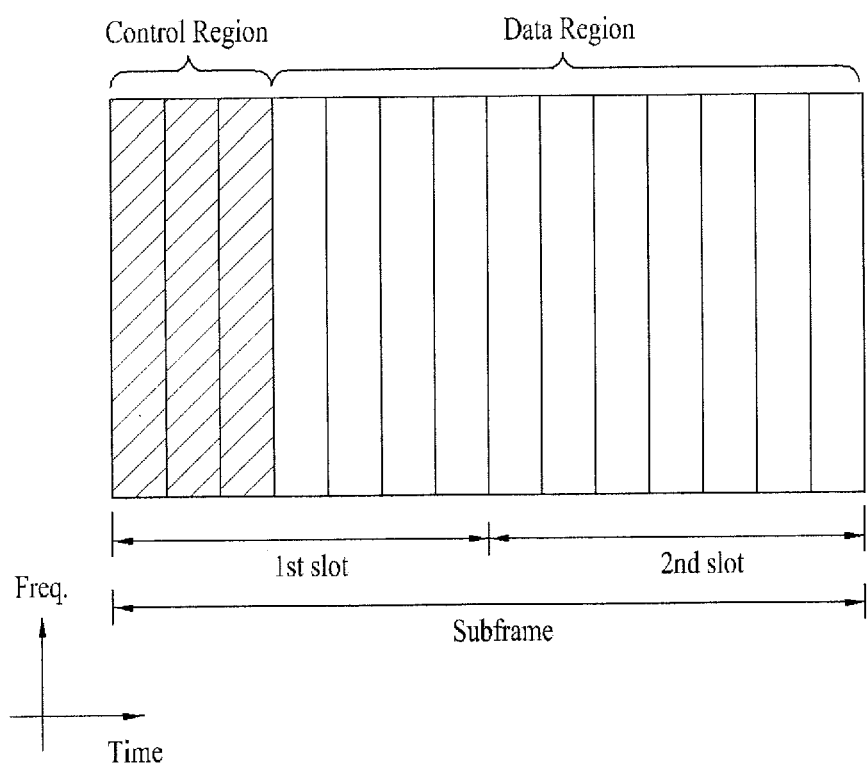
FIG. 4 illustrates a downlink (DL) subframe structure for use in a 3GPP LTE system.

FIG. 4 illustrates a downlink (DL) subframe structure for use in a 3GPP LTE system.

Referring to FIG. 4, one downlink subframe includes two slots in a time domain. A maximum of three OFDM symbols located in the front of the downlink subframe are used as a control region to which control channels are allocated, and the remaining OFDM symbols are used as a data region to which a Physical Downlink Shared Channel (PDSCH) channel is allocated.

DL control channels for use in the 3GPP LTE system include a Physical Control Format Indicator CHannel (PCFICH), a Physical Downlink Control Channel (PDCCH), a Physical Hybrid-ARQ Indicator CHannel (PHICH), and the like. The traffic channel includes a Physical Downlink Shared CHannel (PDSCH). PCFICH transmitted through a first OFDM symbol of the subframe may carry information about the number of OFDM symbols (i.e., the size of control region) used for transmission of control channels within the subframe. Control information transmitted through PDCCH is referred to as downlink control information (DCI). The DCI may indicate UL resource allocation information, DL resource allocation information, UL transmission power control commands of arbitrary UE groups, etc. PHICH may carry ACK (Acknowledgement)/NACK (Not-Acknowledgement) signals about an UL Hybrid Automatic Repeat Request (UL HARQ). That is, the ACK/NACK signals about UL data transmitted from the UE are transmitted over PHICH.

PDCCH acting as a DL physical channel will hereinafter be described in detail.

A base station (BS) may transmit information about resource allocation and transmission format (UL grant) of the PDSCH, resource allocation information of the PUSCH, information about Voice over Internet Protocol (VoIP) activation, etc. A plurality of PDCCHs may be transmitted within the control region, and the UE may monitor the PDCCHs. Each PFCCH includes an aggregate of one or more contiguous control channel elements (CCEs). The PDCCH composed of the aggregate of one or more contiguous CCEs may be transmitted through the control region after performing subblock interleaving. CCE is a logical allocation unit for providing a coding rate based on a Radio frequency (RF) channel status to the PDCCH. CCE may correspond to a plurality of resource element groups. PDCCH format and the number of available PDCCHs may be determined according to the relationship between the number of CCEs and the coding rate provided by CCEs. Control information transmitted over PDCCH is referred to as downlink control information (DCI). The following Table 1 shows DCIs in response to DCI formats.

TABLE 1

| DCI Format | Description |
| --- | --- |
| DCI format 0 | used for the scheduling of PUSCH |
| DCI format 1 | used for the scheduling of one PUSCH codeword |
| DCI format 1A | used for the compact scheduling of one PDSCH codeword and random access procedure initiated by a PDCCH order |
| DCI format 1B | used for the compact scheduling of one PDSCH codeword with precoding information |
| DCI format 1C | used for very compact scheduling of one PDSCH codeword |
| DCI format 1D | used for the compact scheduling of one PDSCH codeword with precoding and power offset information |
| DCI format 2 | used for scheduling PDSCH to UEs configured in closed-loop spatial multiplexing mode |
| DCI format 2A | used for scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustments |

In Table 1, DCI format 0 may indicate uplink resource allocation information. DCI format 1 and DCI format 2 may indicate downlink resource allocation information. DCI format 3 and DCI format 3A may indicate uplink transmit power control (TPC) commands for arbitrary UE groups.

Figure 5:
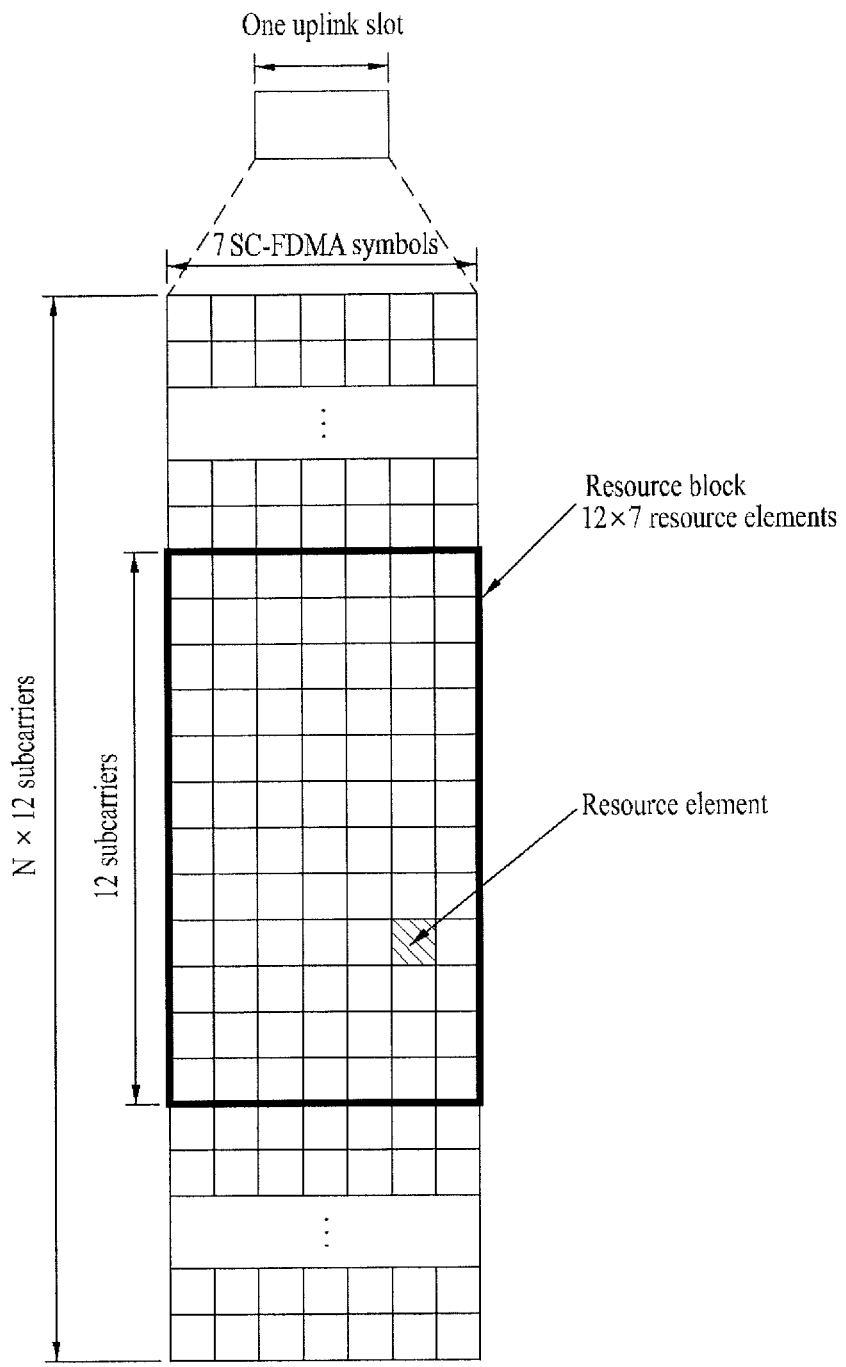
FIG. 5 shows a downlink (DL) time-frequency resource grid structure for use in a 3GPP LTE system.

FIG. 5 shows a downlink time-frequency resource grid structure for use in a 3GPP LTE system according to the present invention. In uplink and downlink, the same time-frequency resource grid structure is used as shown in FIG. 5.

Referring to FIG. 5, a signal transmitted in each slot can be described by a resource grid including $N_{RB} \times N_{SC}$ subcarriers and $N_{symb}$ downlink OFDM symbols or $N_{symb}$ uplink SC-FDMA symbols. Here, $N_{RB}$ represents the number of resource blocks (RBs), $N_{SC}$ represents the number of subcarriers constituting one RB, and $N_{symb}$ represents the number of OFDM or SC-FDMA symbols in one slot. $N_{RB}$ varies with a bandwidth constructed in a cell, and must satisfy $N_{RB}^{min} \leq N_{RB} \leq N_{RB}^{max}$. Here, $N_{RB}^{min}$ is the smallest bandwidth supported by the wireless communication system, and $N_{RB}^{max}$ is the largest bandwidth supported by the wireless communication system.

Although $N_{RB}^{min}$ may be set to 6 ($N_{RB}^{min}=6$) and $N_{RB}^{max}$ may be set to 110 ($N_{RB}^{max}=110$), the scopes of $N_{RB}^{min}$ and $N_{RB}^{max}$ are not limited thereto. The number of OFDM or SC-FDMA symbols contained in one slot may be differently defined according to the length of a Cyclic Prefix (CP) and spacing between subcarriers. When transmitting data or information via multiple antennas, one resource grid may be defined for each antenna port m.

Each element contained in the resource grid for each antenna port is called a resource element (RE), and can be identified by an index pair (k, l) contained in a slot, where k is an index in a frequency domain and is set to any one of 0, . . . , $N_{RB}*N_{sc}-1$, and l is an index in a time domain and is set to any one of 0, . . . , $N_{symb}-1$.

Figure 6:
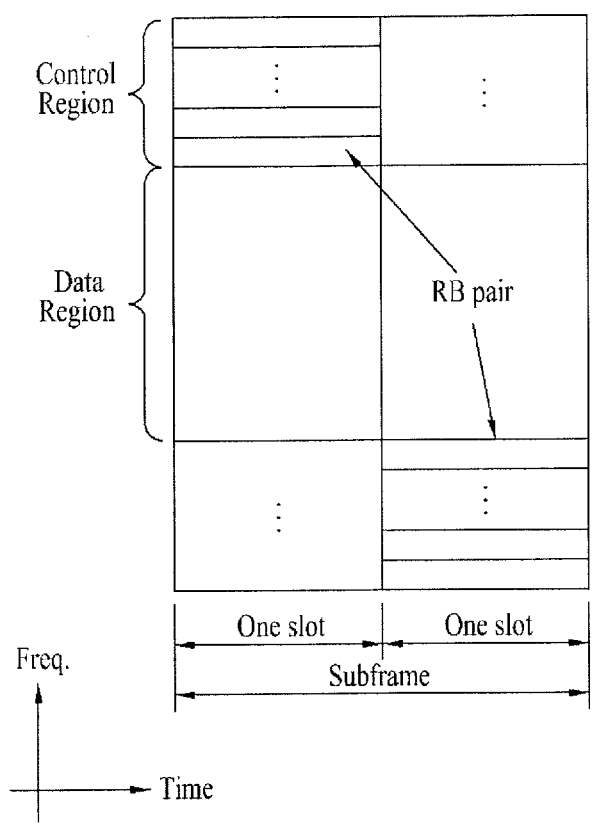
FIG. 6 illustrates an uplink (UL) subframe structure for use in a 3GPP LTE system.

FIG. 6 illustrates an uplink (UL) subframe structure for use in a 3GPP LTE system.

Referring to FIG. 6, the uplink (UL) subframe includes a plurality of slots (e.g., 2 slots). The UL subframe is divided into a data region and a control region in a frequency domain. The data region includes PUSCH and transmits a data signal such as voice, image and the like. The control region includes PUCCH, and transmits Uplink Control Information (UCI). PUCCH includes a pair of RBs (hereinafter referred to as an RB pair) located at both ends of the data region on a frequency axis, and is hopped using a slot as a boundary. Control information may include Hybrid Automatic Retransmit reQuest (HARQ) ACK/NACK, channel information for downlink (hereinafter referred to as 'downlink channel information' or 'channel information'). The downlink channel information may include a CQI, a PMI, an RI, etc. Upon receiving the downlink channel information from each UE, the BS can determine proper time/frequency resources, a modulation method, a coding rate, etc. required for transmitting data to each UE.

Channel information for use in the LTE system may include CQI, PMI, RI, etc. If necessary, some or all of CQI, PMI, and RI may be transmitted in response to a transmission mode of each UE. In an exemplary case in which channel information is periodically transmitted, this exemplary case is referred to as periodic reporting. In another exemplary case in which channel information is transmitted by a request of the BS, this exemplary case is referred to as aperiodic reporting. In case of the aperiodic reporting, a request bit contained in uplink scheduling information received form the BS is transmitted to a UE. Thereafter, the UE transmits channel information considering its own transmission mode to the BS over a PUSCH. In the case of the periodic reporting, a period, an offset for use in the corresponding period, etc. are semi-statically signaled in units of a subframe through a higher layer signal for each UE. Each UE transmits channel information considering the transmission mode to the BS through a PUCCH according to a predetermined period. If uplink data is also present in the subframe carrying channel information, the channel information as well as data is transmitted over a uplink data channel (PUSCH). The BS transmits transmission timing information appropriate for each UE to the UE in consideration of a channel condition of each UE, a UE distribution of each cell, etc. The transmission timing information may include a period, an offset, etc. required for transmitting channel information, and may be transmitted to each UE through a radio resource control (RRC) message.

On the other hand, the wireless communication system such as 3GPP LTE-A or IEEE 802.16 supports various multi-carrier operations so as to extend a bandwidth. Each multi-carrier operation is achieved by aggregating contiguous or non-contiguous carriers such that it implements transmission/reception of data at once. Multiple carrier (or multi-carrier) may also be referred to as carrier aggregation or bandwidth aggregation.

Figure 7:
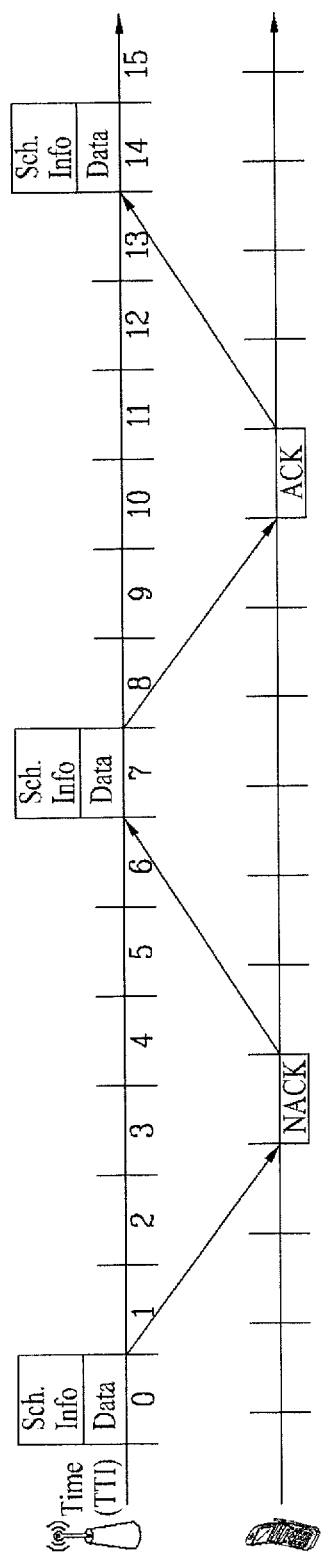
FIG. 7 shows a frequency band for use in a multicarrier-supporting system.

FIG. 7 shows a frequency band for use in a system supporting multiple carriers (i.e., a multicarrier-supporting system).

Referring to FIG. 7, multi-carrier denotes the entire frequency band used by the base station (BS) and is equal to the whole band. For example, the multi-carrier may be 100 MHz.

The component carrier (CC) refers to an element carrier configuring the multi-carrier. That is, a plurality of CCs configures a multi-CC through carrier aggregation. The CC includes a plurality of lower bands. At this time, if the term "multi-carrier" is replaced with the term "whole band", CC aggregation is also called bandwidth aggregation. As a subband, the lower band may be replaced with a partial band. In addition, the carrier aggregation can extend a bandwidth by collecting a plurality of carriers in order to increase a data rate. For example, in the existing system, one carrier is 20 MHz. However, the bandwidth can be extended to 100 MHz by collecting five carriers each having 20 MHz. The carrier aggregation includes aggregation of carriers located in different frequency bands.

Under the environment in which the multicarrier-supporting structure shown in FIG. 7 or different sizes of cells such as a femto-cell, a relay node (RN) or a pico-cell are simultaneously operated on a network, the signal interference problem among individual carriers may occur. In addition, in the case of supporting the multi-carrier operation, if the UE is ready to receive multiple carriers or operates an uplink chain to packets through multiple carriers, power consumption for the multiple carriers may excessively increase.

The UE receiving downlink data does not know a time point of traffic transmission. Thus, under the UE is powered on, an RF chain for multiple carriers and analog-to-digital (AD) conversion of the corresponding signal must always be achieved and at the same time basic digital conversion processing must also be performed. Therefore, if packets are not actually transmitted via downlink, unnecessary power consumption occurs.

In comparison between downlink power with uplink power, in the case of uplink, the UE may perform power control using control information based on power control scheduling received from the BS. Uplink scheduling determines which frequency band is to be used by the BS that transmits uplink data at a specific time point, and also determines which UE is to be used as a transmission target of uplink data. In addition, the uplink scheduling may adjust the amount of power required for uplink data transmission.

On the other hand, downlink scheduling determines which frequency band is used by the BS at a specific time point, and also determines which UE is to be used as a data transmission target. Therefore, the UE has difficulty in controlling power in association with downlink traffic reception in so far as the UE does not receive additional signaling for downlink scheduling.

Therefore, the present invention provides a method for enabling the UE to perform a power control operation required for downlink multi-carrier transmission.

The present invention provides a power control method for downlink multi-carrier reception of the UE, also provides a method for controlling power in consideration of a multi-carrier reception status. For example, as to a specific HARQ process index or ID value depending on a HARQ process index or ID value, a multi-carrier reception mode (i.e., a reception mode for downlink carrier aggregation) is applied to the specific HARQ process index or ID value. As to other HARQ process index or ID values, a single-carrier reception mode (i.e., reception of a downlink signal to which carrier aggregation is not applied) may be applied to the other HARQ process index or ID values. In addition, associated configuration information is configured in the form of an ACK signal of the UE request or the entire configuration information signaling (RRC signaling, or PDCCH transmission, or MAC messaging) of the BS, and is received by the UE. In addition, in order to allow the UE not to receive data during a predetermined time or information or to receive carrier aggregation only at a specific time, the present invention proposes a method for receiving a downlink signal to which carrier aggregation is applied only at a specific time using a specific method for defining the same UE state as in a UE's DRX operation defined in the legacy LTE Release 8 and 9. In addition, in accordance with the present invention, since the UE receives a signal specifying a valid period of carrier aggregation from the BS, a downlink signal reception mode of the carrier aggregation scheme can be applied only to the corresponding time period. The above-mentioned schemes may be used along with other methods prescribed in the present invention, and may also be used along with other methods not prescribed in the present invention. If necessary, even in the case of single carrier reception but not carrier aggregation, a downlink signal reception mode of the UE and a downlink signal non-reception mode of the UE may be configured to reduce power consumption of the UE not only in a carrier aggregation situation but also in a single carrier reception situation.

1. First Embodiment (Use of Multiple Carriers Based on HARQ Process)

In order to control errors encountered after transmission of uplink or downlink scheduling data, an automatic repeat request (ARQ) scheme and an evolved HARQ scheme may be used may be used.

Basically, the ARQ scheme can control errors according to transmission or non-transmission of ACK/NACK signals under the condition that a transmitter transmits one frame and then correctly receives a frame from the receiver without any errors. If the receiver receives the frame without any errors, it transmits an ACK signal. If there is data to be transmitted to the buffer, the receiver transmits the next frame. If the receiver receives an erroneous frame, the erroneous frame is deleted from a buffer of the receiver, the receiver transmits an NACK signal to the transmitter, and the transmitter retransmits the same frame to the receiver.

Differently from the ARQ scheme, the HARQ scheme transmits a NACK signal from the receiver to the transmitter under the condition that the received frame is not demodulated, and the HARQ scheme also stores the pre-received frame in a buffer during a predetermined time in which the corresponding frame can be retransmitted, such that the retransmitted frame is combined with the pre-received frame, resulting in an increased success rate.

In recent times, the HARQ scheme more effective than the basic ARQ scheme has been widely used throughout the world. A variety of HARQ schemes may be used. In accordance with a retransmission timing point, the HARQ schemes may be classified into a synchronization HARQ scheme and an asynchronous HARQ scheme. In addition, the HARQ schemes may be classified into a channel-adaptive HARQ scheme and a channel-non-adaptive HARQ scheme according to whether a channel status is reflected in the amount of resources to be used for retransmission.

If initial transmission fails, the synchronous HARQ scheme performs the next retransmission at a time point decided by the system. That is, provided that a retransmission time point is achieved every fourth time unit after initial transmission has failed, the above-mentioned retransmission time point need not be further signaled between the UE and the BS because it has already been promised between the UE and the BS. However, if the transmitter of data receives the NACK message, a frame is retransmitted every fourth time unit until receiving the ACK message.

On the other hand, the asynchronous HARQ scheme may be achieved through a newly scheduled retransmission time point or additional signaling. A retransmission time point of the previously failed frame may be changed according to various reasons such as a channel state or the like.

The channel non-adaptive HARQ scheme performs the HARQ operation using the same parameters (for example, frame modulation, the number of used RBs, adaptive modulation and coding (AMC), etc.) as those of initial transmission. Differently from the channel non-adaptive HARQ scheme, the channel adaptive HARQ scheme is changed according to a channel status. In more detail, according to the channel non-adaptive HARQ scheme, when the transmitter transmits data using 6 RBs during the initial transmission, and then retransmits data using the same 6 RBs. In contrast, according to channel adaptive HARQ scheme, although a transmitter transmits data using 6 RBs, the transmitter may retransmit data using 6 or less RBs according to the next channel status.

Although four HARQ combinations may be used according to the above-mentioned classification, it should be noted that the asynchronous channel adaptive HARQ scheme and the synchronous channel non-adaptive HARQ scheme are generally used.

Since the asynchronous channel adaptive HARQ scheme adaptively changes a retransmission time point and the amount of resources to be used according to a channel state, retransmission efficiency is maximized and overhead unexpectedly increases, such that the asynchronous channel adaptive HARQ scheme is not generally considered for uplink.

On the other hand, in the case of the synchronous channel non-adaptive HARQ scheme, a retransmission time point and resource assignment are promised in a system, such that the synchronous channel non-adaptive HARQ scheme has an advantage in that it generates little overhead for the above-mentioned retransmission and resource assignment. In contrast, provided that the synchronous non-adaptive HARQ scheme is used in an environment of excessive channel state variation, the HARQ retransmission efficiency is greatly reduced.

In the 3GPP LTE, the asynchronous HARQ scheme has been used for downlink as a basic scheme, and the synchronous HARQ scheme has been used for uplink as a basic scheme in the remaining cases other than a specific situation (for example, a specific traffic situation such as semi-persistent scheduling, or a specific transmission situation).

Figure 8:
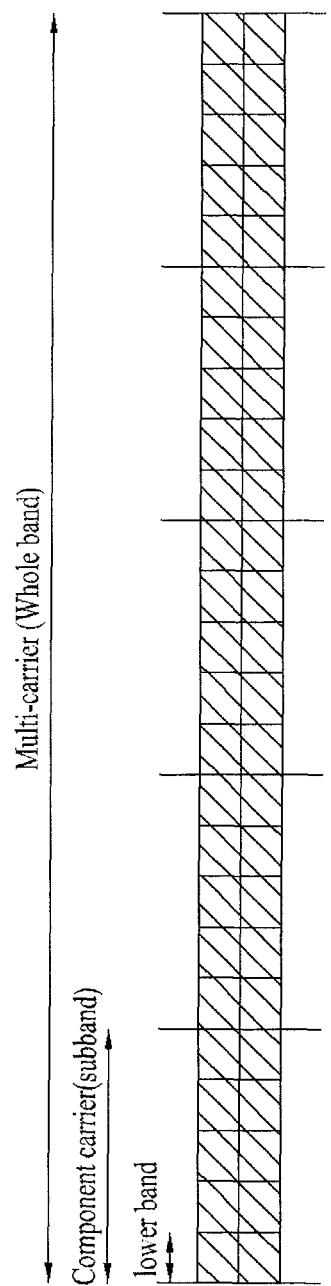
FIG. 8 is a diagram illustrating resource allocation and retransmission of the asynchronous HARQ scheme.

FIG. 8 is a diagram illustrating resource allocation and retransmission of the asynchronous HARQ scheme. In downlink, until ACK/NACK information is received from the UE upon completion of data transmission by scheduling, and the next data is then transmitted, a time delay occurs as shown in FIG. 8. In more detail, the time delay occurs due to channel propagation delay, data decoding, and a time required for the data encoding. For seamless data transmission during the above time delay, a method for transmitting data using an independent HARQ process has been used.

For example, provided that the shortest time period from current data transmission to the next data transmission is composed of 7 subframes, it is possible to perform seamless data transmission using 7 independent process. If the LTE system is not operated in MIMO, a maximum of 8 processes can be assigned.

Referring to FIG. 8, in the case of using the HARQ operation to control downlink reception power consumption of the UE according to one embodiment of the present invention, a predetermined time delay is assigned to a transmission structure of mutual response messages due to limited processing power of the UE and the BS for use in the HARQ operation, N groups are derived from the entire HARQ process indexes or ID values, and different UE downlink reception methods (or modes) are applied to individual HARQ process indexes or ID groups in such a manner that the embodiment of the present invention can control UE reception power consumption under a downlink carrier aggregation situation. Hereinafter, it is assumed that N is set to 2 (N=2), a downlink multi-carrier reception mode is applied to a specific HARQ process group, and a downlink single-carrier reception mode is applied to other HARQ process group. However, the proposed schemes of the present invention can be equally applied not only to a case in which N HARQ process groups are defined but also to another case in which the number of different UE downlink reception modes defined to reduce UE reception power consumption is set to N greater than 2.

Figure 9:
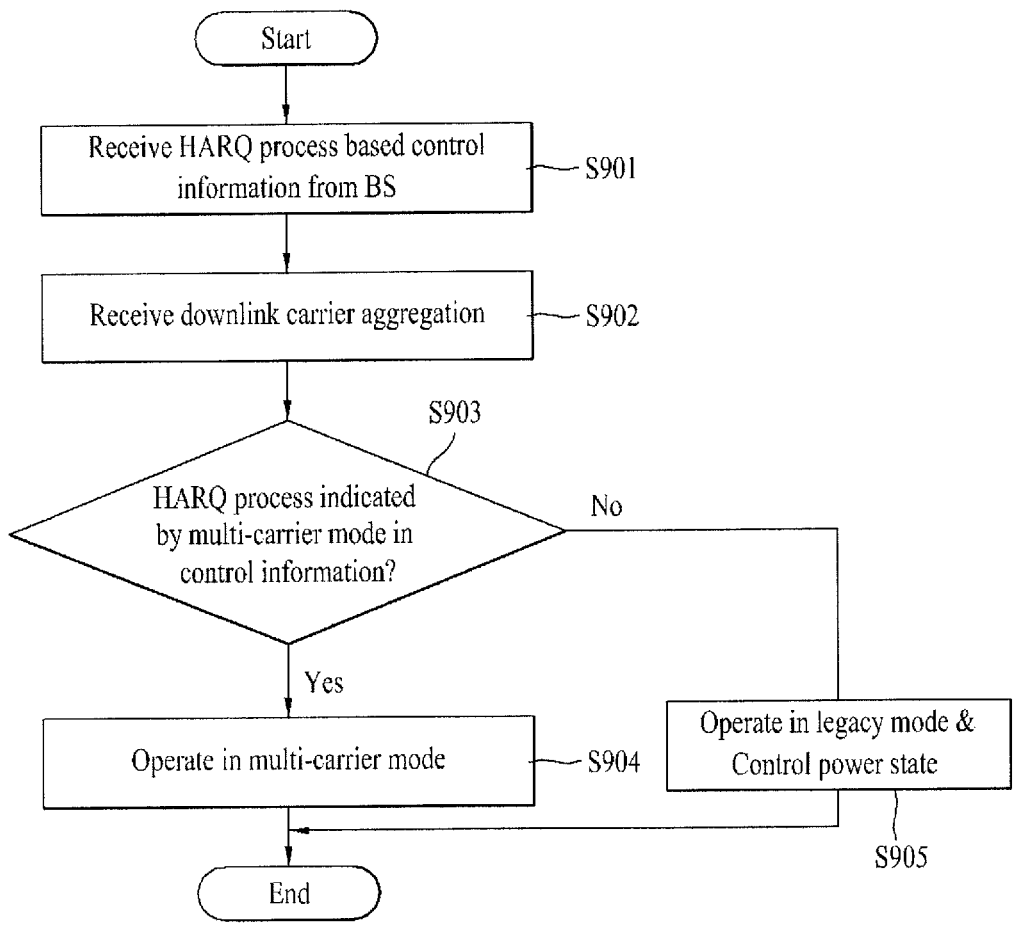
FIG. 9 is a flowchart illustrating a power control method according to one embodiment of the present invention.

FIG. 9 is a flowchart illustrating a method for controlling UE reception power consumption according to one embodiment of the present invention.

Referring to FIG. 9, a UE receives HARQ-based control information depending on a multi-carrier scheduling process for the HARQ operation from the BS in step S901. The control information may include information per HARQ process index (or per ID) capable of being used in UE power control and/or may include downlink information for the corresponding UE.

The HARQ process defined in the LTE system includes a plurality of processes in response to a processing time delay situation of the receiver. Therefore, provided that the BS according to one embodiment of the present invention assigns carrier aggregation only to at least one process from among arbitrary HARQ processes of a specific UE, the UE may receive multiple carriers only at a subframe time point at which the determined HARQ process is activated.

The carrier aggregation assignment and control information based on the HARQ process operation may include information regarding a specific time at which a specific HARQ process is activated so that packet is transmitted/retransmitted. That is, the above-mentioned The carrier aggregation assignment and control information may include information regarding an HARQ process index (or ID) for multi-carrier reception or information regarding subframe indexes. In this case, the above-mentioned control information may command the UE to perform the independent multi-carrier reception operation for each HARQ process, or may inform the UE of information regarding HARQ processes to which the multi-carrier reception operation is applied. In this case, the above-mentioned control information may include information indicating multiple carriers acting as a reception object of the corresponding HARQ process.

Through the above-mentioned control information, the HARQ process specified by multiple carriers may be designated by an HARQ process ID or may be transmitted through an index bitmap.

Thereafter, the UE receives downlink carriers from the BS in step S902.

The UE having received the HARQ-based power control information determines an operation mode in consideration of information as to whether the HARQ process of the above-mentioned control information is indicated by a multi-carrier mode in step S903.

That is, in a specific HARQ process to which the multi-carrier reception operation is applied according to control information, the UE is operated in a multi-carrier reception mode designated by a downlink signal. During the multi-carrier mode of the present invention, an RF chain of multiple carriers and associated A/D conversion may be performed as described above or a plurality of RF chains and A/D conversion may be performed in step S904.

The HARQ processes defined in the above-mentioned control information are operated in the multi-carrier reception mode, and at the same time the UE is operated in a legacy reception mode (e.g., a single-carrier reception mode) for other HARQ processes in step S905. Through the above-mentioned reception operation process, the UE does not perform the basic operation of the multi-carrier mode in the remaining HARQ processes other than a specific time at which the designated HARQ process is activated, resulting in reduction in power consumption.

In accordance with one embodiment of the present invention, the BS can perform the following power control operation.

1) When constructing control information regarding the multi-carrier reception mode indication and/or control information regarding the single-carrier reception mode indication so as to reduce UE reception power consumption based on the HARQ process, the BS may construct control information that independently indicates multiple carriers per HARQ process, or may combine control information (for example, indication information of 10-bits bitmap or 40-bits bitmap) indicating multiple carriers of a specific number of HARQ processes.

2) The BS may establish different carrier aggregation structures for individual HARQ processes during the HARQ scheduling process. That is, if the UE stays in the single-carrier reception mode or the multi-carrier reception mode, information regarding the number of carriers to be received and/or information regarding carrier indexes are independently assigned to each HARQ. In addition, downlink carrier configuration to be received for each HARQ process index or ID can be established in such a manner that carrier aggregation configuration information used by the first HARQ process ID and carrier aggregation configuration information used by the second HARQ process ID are differently constructed. The proposed method may be used for carrier scheduling according to a channel status or be used for coordination between multiple cells, when it is difficult to establish dynamic carrier configuration or when a channel condition exceeds an update period of carrier configuration or dynamics.

3) In association with at least one downlink HARQ process in which the UE can operate in the multi-carrier reception mode, the BS can transmit scheduling control information of the corresponding HARQ process or other control information, etc. through cross-carrier scheduling at specific carriers (for example, a primary CC or a primary cell). The cross-carrier scheduling is adapted to transmit scheduling/resource assignment information or specific control information for other subcarriers to the designated carrier through a PDCCH including a carrier indicator field (CIF) using RRC signaling or MAC messaging. In this case, through a specific carrier (for example, primary carrier or primary cell) commonly constructed for each HARQ process, the UE can receive cross-carrier scheduling control information through the corresponding carrier, regardless of the HARQ process ID. Control information regarding the multi-carrier reception mode related to at least one HARQ process and/or control information regarding the single-carrier reception mode related to the at least one HARQ process may be signaled to the UE by one or more specific carriers. In this case, a UE-specific carrier configuration may be established or a carrier pre-established in the system may be established or a carrier related to downlink and uplink may be established. In addition, a downlink primary carrier or a downlink primary cell may also be established as necessary.

4) Since individual HARQ process IDs may have different independent cross-carrier scheduling configurations and/or different independent cross-carrier scheduling setting, a certain HARQ process ID can be used as an application target of the cross-carrier scheduling during transmission of such control information, but it should be noted that no cross-carrier scheduling may be applied to another HARQ process ID as necessary. In another example, it may also be possible for cross-carrier scheduling not to be applied to all HARQ process IDs as necessary.

For transmission of system information, the BS may define carrier aggregation of a subframe (or an HARQ process ID or index) to which system information is transferred. The carrier aggregation information for a subframe to which system information is transmitted and/or the HARQ process ID (or a specific subframe index) may be transmitted to the UE along with downlink multi-carrier configuration information related to a specific one HARQ process ID or all HARQ process IDs in step S901 indicating reception of the UE power control information, or may be transmitted to the UE through additional signaling (for example, UE-specific RRC (higher layer) signaling, MAC message or PDCCH). In contrast, the BS may also transmit information regarding other carriers to the UE through a specific carrier as necessary.

2. Second Embodiment (Use of Definition of Multi-Carrier Reception Operations that are Discontinuously Established In order to minimize power consumption of UE downlink reception in the 3GPP LTE, a UE of an idle mode (hereinafter referred to as an idle-mode UE) discontinuously receives a paging message. The above-mentioned UE situation is called a DRX mode of the UE. That is, the UE powers on a transceiver at a predetermined time, and monitors a paging channel. Upon receiving a paging message of the UE through a paging channel, the UE transitions to a connection status. If the UE paging message is not received through a paging channel, the UE powers off the transceiver and then enters a sleep mode until reaching the next wakeup time point.

The UE may establish an appropriate discontinuous reception (DRX) mode in consideration of characteristics of services that are operating in the connection-status UE.

Figure 10:
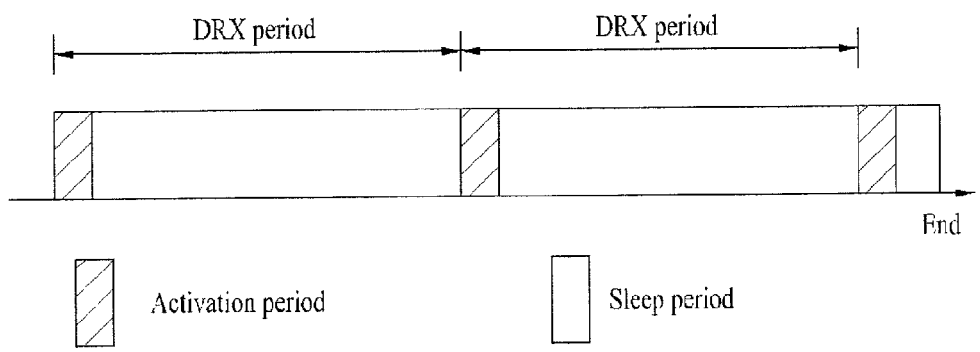
FIG. 10 is a conceptual diagram illustrating a discontinuous reception (DRX) operation.

FIG. 10 is a conceptual diagram illustrating a discontinuous reception (DRX) operation.

Referring to FIG. 10, if a UE stays in an active state in which the UE is powered on, the UE confirms the presence or absence of downlink data, receives data, and is powered off in a sleep state, such that power consumption can be minimized. The length between a first activation period and a second activation period corresponds to a DRX cycle length. The DRX operation can receive data simultaneously while minimizing UE power consumption, such that the start and end of the activation state are associated with data reception.

In accordance with a method for controlling power consumption required for downlink reception of the UE, the UE can receive scheduling control information of carrier aggregation or each carrier that transitions to an activation state only at a specific time point decided on the basis of associated control information received from the BS using the concept of a DRX mode. That is, while an arbitrary downlink carrier is not received during a predetermined time, if a current time reaches a specific time, the UE may receive a signal through the corresponding carrier at the specific time.

Figure 11:
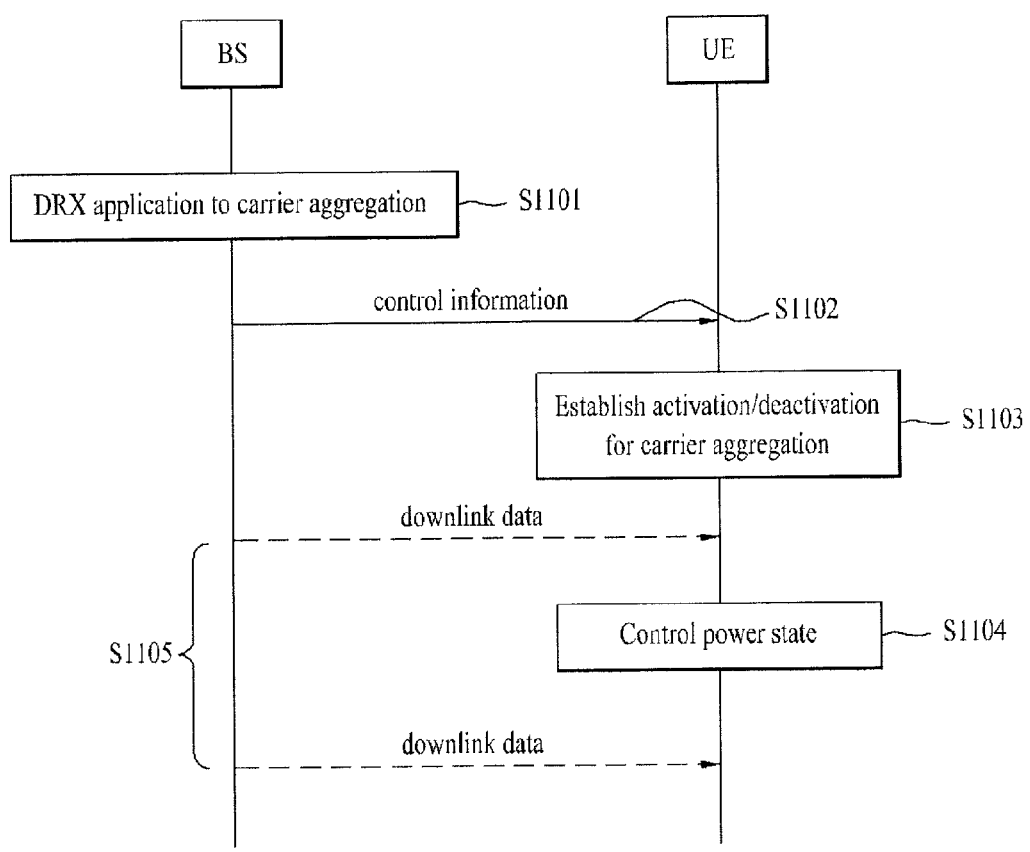
FIG. 11 is a flowchart illustrating a power control method according to another embodiment of the present invention.

FIG. 11 is a flowchart illustrating a method for controlling downlink reception power of the UE according to another embodiment of the present invention.

Referring to FIG. 11, the UE may independently establish the DRX mode for each downlink carrier, or may simultaneously apply the DRX mode to all carriers, such that the UE determines whether the downlink carrier signal is received in step S1101.

In a specific downlink carrier scheduling step, the BS establishes activation/deactivation of the corresponding carrier for use in the carrier aggregation in association with the DRX operation of the UE, such that the BS may determine the DRX period as an activation period. Alternatively, activation/deactivation of the carrier aggregation may be differently established irrespective of the UE's DRX operation, and the period in which the monitoring result of activation or deactivation is sent to the UE may be constructed irrespective of the DRX period. As a result, it is possible to previously adjust burst traffic that is transmitted to the UE. In this case, if the UE stays in an activation state instead of the DRX state in association with a specific downlink carrier, activation/deactivation for each carrier may be performed on the basis of a specific time period configured by the BS.

The BS may construct control information including information regarding the activation/deactivation conversion period related to carrier aggregation, and transmit the constructed control information to the UE in step S1102. The control information is transmitted through UE-specific signaling or UE-specific/carrier-specific higher layer signaling, may be transmitted to the UE along with UE-specific carrier configuration information or may be transmitted to the UE through additional signaling. Conversion period of the activation/deactivation operation related to carrier aggregation may be established in units of 10 ms, 5 ms, 20 ms, or 40 ms.

The UE that stays in an activation state upon receiving the above-mentioned control information, establishes activation/deactivation of the carrier aggregation on the basis of a time period related to carrier activation/deactivation, and then performs power control according to the established activation/deactivation in step S1103. That is, if carrier aggregation enters the activation state, the UE is powered on. If carrier aggregation enters the deactivation state, the UE is powered off. However, if the UE transitions to the DRX mode, the activation/deactivation timing point of each downlink carrier may be initialized.

If the HARQ process is not terminated in the activation period, the UE may extend the activation period. In this case, the activation period only for the specific HARQ process ID may be extended or the activation period for all the HARQ process IDs may also be extended.

3. Third Embodiment (that Directly Indicates Time Period in which Carrier Aggregation is Valid A method for controlling downlink reception power consumption of the UE according to one embodiment of the present invention enables the BS to directly indicate a valid time and/or valid period for activation/deactivation of carrier aggregation, such that it transmits the resultant information to the UE through higher layer RRC signaling (or MAC messaging (activation/deactivation command) or PDCCH).

Figure 12:
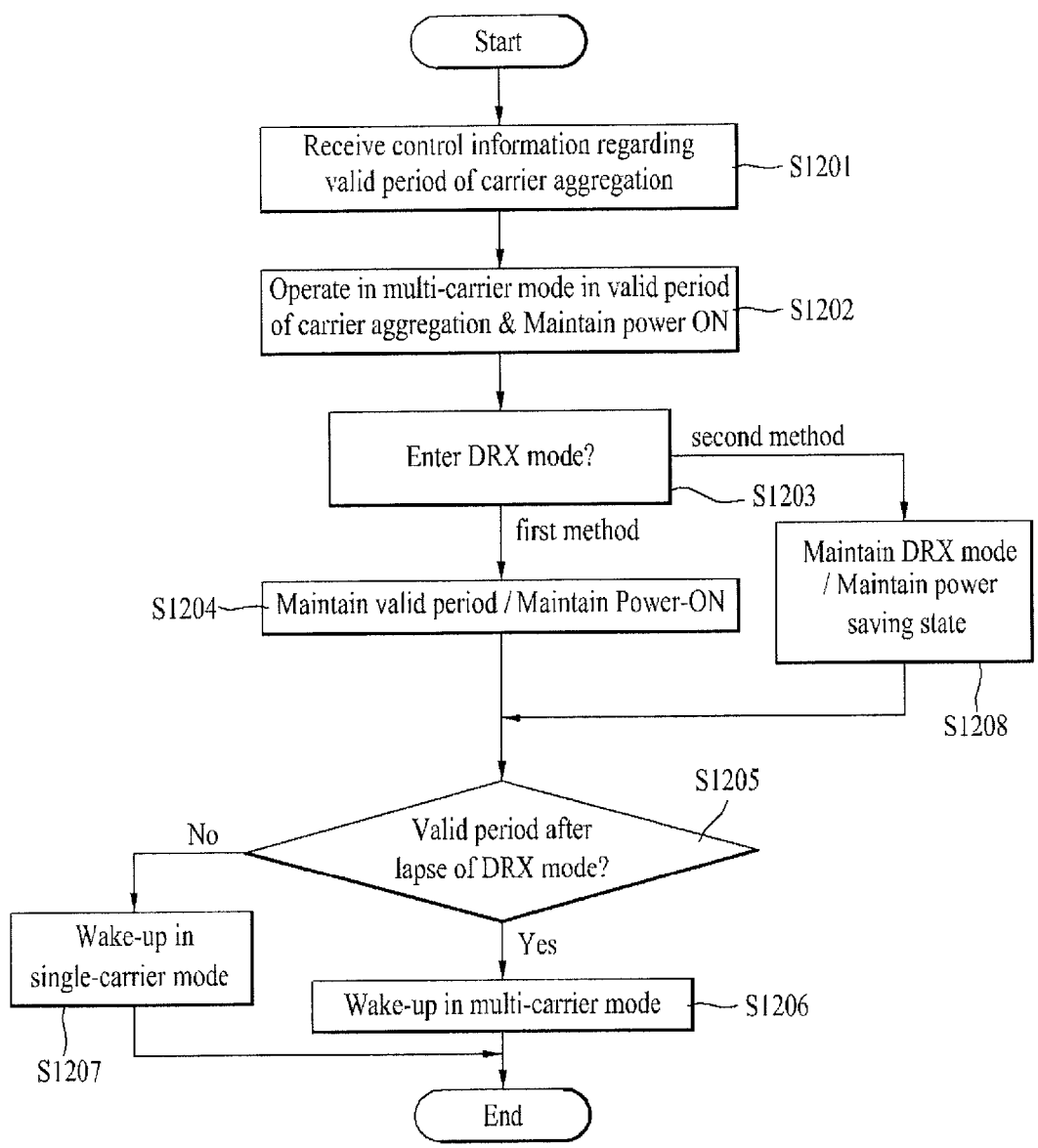
FIG. 12 is a flowchart illustrating a power control method according to yet another embodiment of the present invention.

FIG. 12 is a flowchart illustrating a power control method according to yet another embodiment of the present invention. In FIG. 12, it is assumed that the UE may receive information regarding the DRX period from the BS or may be pre-established.

Referring to FIG. 12, the UE receives control information regarding a valid time in which carrier aggregation is activated or control information regarding another valid time in which carrier aggregation is deactivated from the BS in step S1201.

As an example of a method for defining a valid time or a valid period according to the carrier activation/deactivation, the embodiment of the present invention may directly indicate a valid time or valid period, or may indirectly indicate a valid time or valid period. As an example of the method for indirectly indicating the valid time of carrier aggregation, the embodiment may determine a valid period on the basis of the amount of data received by the UE. That is, the valid time may be defined in a manner that carrier aggregation is valid until the UE receives a predetermined amount of data. In case of downlink, the predetermined amount of data may be arbitrarily determined to be the amount of data transmitted from the BS by the BS. In case of uplink, the predetermined amount of data may be adjusted by the BS upon receiving a request from the UE.

Simultaneously with information of a valid period of carrier aggregation or separately from the valid period information, activation/deactivation information of the carrier aggregation may be automatically constructed along with a higher layer signal, or may be configured as either the activation/deactivation command through MAC messaging or the PDCCH-based L1/L2 control signal.

Thereafter, the UE is operated as a multi-carrier code in a valid period of carrier aggregation on the basis of the above-mentioned control information. The power-ON status of the UE is maintained in step S1202. If the received control information indicates a specific valid period, the UE may be operated in the multi-carrier mode during the corresponding time period. If the control information indirectly indicates a valid time of the carrier aggregation, the UE is operated in the multi-carrier mode until receiving all parts of the corresponding data. In the remaining time, the UE may remain in a power saving mode (for example, a power-off state). However, activation/deactivation may be individually established for downlink carriers constructed according to the downlink carrier aggregation configuration. In this case, the UE receives an indication message regarding a valid time or valid period related to activation/deactivation of arbitrarily configured downlink carriers from the BS through one of the above-mentioned signaling methods, such that it can determine whether the signal reception operation is performed on each of the corresponding downlink carriers.

The UE maintains carrier aggregation information defined according to the above-mentioned control information during a predetermined time. However, according to the first scheme, provided that the UE enters a specific DRX mode in step S1203, if the UE stays in the valid period in units of the entire carrier or each carrier in relation to individual configured downlink subcarriers, irrespective of the specific DRX mode, the UE downlink carrier reception operation can be maintained in the ON state in step S1204. In this case, provided that the UE is woken up from the DRX mode and is then powered on, if the UE still remains in the valid period, the UE can be awoken in the multi-carrier mode in steps S1205 and S1206. At the time at which the UE is woken up from the DRX mode, if the UE does not belong to the carrier aggregation valid period, the UE can be awoken into the single carrier mode in step S1207. if necessary, in case of the configured downlink structure, from the viewpoint of the UE reception operation, the UE ON/OFF states may be independently determined in units of a downlink carrier according to a configuration situation of a valid period or valid time for activation/deactivation.

On the other hand, if the UE enters the DRX mode in step S1203, the UE can enter or maintain the sleep mode using the second scheme. In more detail, according to the second scheme, irrespective of activation/deactivation information of the corresponding carrier aggregation, the UE maintains the DRX mode of the entire downlink carriers, or may enter or maintain the sleep mode. That is, valid time information related to the received carrier aggregation is invalidated in step S1208.

As described above, the above-mentioned power control methods according to embodiments of the present invention may be used independently or in combination so as to control the carrier aggregation operation.

The base station (BS) and the user equipment (UE) applicable to embodiments of the present invention will hereinafter be described with reference to FIG. 13.

Figure 13:
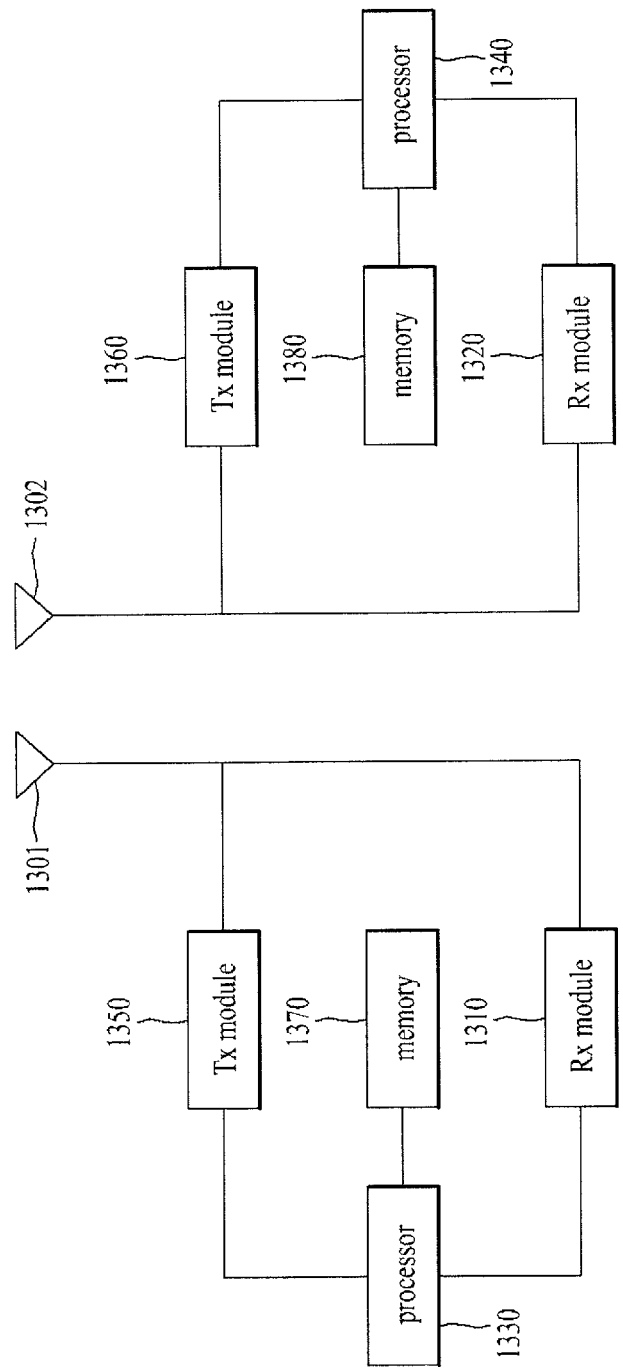
FIG. 13 is a block diagram illustrating a base station (BS) and a user equipment (UE) according to one embodiment of the present invention.

FIG. 13 is a block diagram illustrating a base station (BS) and a user equipment (UE) according to one embodiment of the present invention.

Referring to FIG. 13, the UE may operate as a transmitter on uplink and as a receiver on downlink, while the BS may operate as a receiver on uplink and as a transmitter on downlink. That is, each of the UE and the BS may include a transmitter and a receiver for transmission and reception of information or data.

The transmitter and the receiver may include processors, modules, parts, and/or means for implementing the exemplary embodiments of the present invention. Especially, the transmitter and the receiver may include a module (means) for encrypting messages, a module for interpreting encrypted messages, an antenna for transmitting and receiving messages, etc.

Referring to FIG. 13, the left part corresponds to the transmitter (i.e., the BS) and the right part corresponds to the receiver (i.e., the UE). Each of the transmitter and the receiver may include an antenna 1301 or 1302, a Reception (Rx) module 1310 or 1320, a processor 1330 or 1340, a Transmission (Tx) module 1350 or 1360, and a memory 1370 or 1320.

The antennas 1301 and 1302 include Tx antennas for transmitting signals generated from Tx modules 1350 and 1360 to an external part, and Rx antennas for receiving radio frequency (RF) signals from the external part and providing the received RF signals to the Rx modules 1310 and 1320. If Multiple Input Multiple Output (MIMO) is supported, two or more antennas may be provided.

The Rx modules 1310 and 1320 may recover original data by demodulating and decoding data received through the antennas 1301 and 1302 and provide the recovered data to the processors 1330 and 1340. Although the Rx modules and the antennas may be separated from each other as shown in FIG. 13, it should be noted that the Rx modules and the antennas may also be denoted only by the receiver for receiving RF signals.

The processors 1330 and 1340 generally provide overall control to the AMS. Especially, the processors 1330 and 1340 may perform a controller function for implementing the above-described exemplary embodiments of the present invention, a variable MAC frame control function based on service characteristics and a propagation environment, a handover (HO) function, an authentication and encryption function, etc.

The Tx modules 1350 and 1360 perform predetermined coding and modulation for data, which is scheduled by schedulers connected to the processors 1330 and 1340 and transmitted to the outside, and then transfer the modulated data to the antennas 1301 and 1302. The Tx modules and the antennas may be separated from each other as shown in FIG. 13, it should be noted that the Tx modules and the antennas may also be denoted only by the transmitter for transmitting RF signals.

The memories 1370 and 1380 may store programs for processing and control of the processors 1330 and 1340, temporarily store input/output data (uplink (UL) grant, system information, station identifier (STID), flow identifier (FID), action time, etc. in case of the UE).

In addition, each of the memories 1370 and 1380 may include at least one type of storage media such as a flash memory, a hard disk, a multimedia card micro, a card-type memory (e.g. a Secure Digital (SD) or eXtreme Digital (XD) memory), a Random Access Memory (RAM), a Static Random Access Memory (SRAM), a Read-Only Memory (ROM), an Electrically Erasable Programmable Read-Only Memory (EEPROM), a Programmable Read-Only Memory, a magnetic memory, a magnetic disc, an optical disc, etc.

The processor 1330 of the transmitter performs overall control of the BS. In accordance with the embodiments shown in FIGS. 9, 11, and 12, the carrier scheduling and control information for performing power control in a downlink multi-carrier mode may be constructed.

For example, as can be seen from FIG. 9, control information indicating a specific HARQ process corresponding to the HARQ-based multi-carrier mode may be configured in a manner that the UE can perform power control in the multi-carrier mode. In addition, as can be seen from FIG. 11, control information indicating activation/deactivation of the carrier aggregation in the multi-carrier mode may be configured in the multi-carrier mode. Furthermore, as can be seen from FIG. 12, a valid period in which carrier aggregation is valid may be decided so that associated control information can be constructed. The processor 1330 may transmit control information for power control to the receiver through the Tx module 1350.

The processor 1340 of the receiver performs overall control of the UE. Based on power control information received through the Rx module 1320, power control of the carrier aggregation transmitted at a specific time of the multi-carrier mode is achieved using a multi-carrier code. In more detail, based on control information shown in the embodiments of FIGS. 9, 11 and 12, the remaining carriers other than a specific carrier aggregation corresponding to the multi-carrier mode are not operated in the multi-carrier mode, such that power consumption can be greatly reduced.

In accordance with the embodiments of the present invention, the processors 1330 and 1340 may be configured to transmit the above-mentioned control information through additional signaling instead of a DM-RS. In the meantime, the BS may perform a control function for implementing the above-described exemplary embodiments of the present invention, Orthogonal Frequency Division Multiple Access (OFDMA) packet scheduling, Time Division Duplex (TDD) packet scheduling and channelization, a variable MAC frame control function based on service characteristics and propagation environment, a real-time high-speed traffic control function, a handover function, an authentication and encryption function, a packet modulation/demodulation function for data transmission and reception, a high-speed packet channel coding function, a real-time MODEM control function, etc., by at least one of the above-described modules, or the BS may further include an additional module, part or means for performing these functions.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other.

Accordingly, the invention should not be limited to the specific embodiments described herein, but should be accorded the broadest scope consistent with the principles and novel features disclosed herein.

The embodiments of the present invention are applicable to various wireless access systems including a $3^{rd}$ Generation Partnership Project (3GPP) system, a 3GPP2 system, and/or an Institute of Electrical and Electronic Engineers (IEEE) 802.xx system. Besides these wireless access systems, the embodiments of the present invention are applicable to all technical fields to which wireless access systems are applied.

What is claimed is:

1. A method of activating or deactivating frequency resources at a terminal configured with a primary frequency resource and one or more non-primary frequency resources in a wireless communication system, the method comprising:

receiving, by the terminal, a medium access control (MAC) signal for activating the one or more non-primary frequency resources indicated by a carrier indicator included in a downlink control channel carried by the primary frequency resource;

activating, by the terminal, the one or more non-primary frequency resources; and deactivating, by the terminal, the one or more non-primary frequency resources on expiry of a specific time period configured by radio resource control (RRC) signaling, the specific time period being for which the one or more non-primary frequency resources are activated, wherein the terminal is configured to receive no downlink signal on the deactivated one or more non-primary frequency resources, wherein the specific time period has a length determined based on an amount of traffic which the terminal has to receive when the terminal receives a downlink signal on the one or more non-primary frequency resources, and the specific time period has a length determined based on an amount of traffic which the terminal has to transmit when the terminal transmits an uplink signal on the one or more non-primary frequency resources.

2. The method of claim 1, wherein the specific time period is independent of a discontinuous reception (DRX) related operation.

3. The method of claim 1, wherein the primary frequency resource includes a primary component carrier, and the one or more non-primary frequency resources include one or more non-primary component carriers.

4. The method of claim 1, wherein the specific time period is configured per non-primary frequency resource.

5. A terminal for activating or deactivating frequency resources in a wireless communication system, the terminal being configured with a primary frequency resource and one or more non-primary frequency resources, the terminal comprising:
- a radio frequency (RF) module; and
- a processor configured to:
  - receive a medium access control (MAC) signal for activating the one or more non-primary frequency resources indicated by a carrier indicator included in a downlink control channel carried by the primary frequency resource,
  - activate the one or more non-primary frequency resources, and
  - deactivate the one or more non-primary frequency resources on expiry of a specific time period configured by radio resource control (RRC) signaling, the specific time period being for which of the one or more non-primary frequency resources are activated,
- wherein the terminal is configured to receive no downlink signal on the deactivated one or more non-primary frequency resources,
- wherein the specific time period has a length determined based on an amount of traffic which the terminal has to receive when the terminal receives a downlink signal on the one or more non-primary frequency resources, and
- the specific time period has a length determined based on an amount of traffic which the terminal has to transmit when the terminal transmits an uplink signal on the one or more non-primary frequency resources.

6. The terminal of claim 5, wherein the specific time period is independent of discontinuous reception (DRX) related operation.

7. The terminal of claim 5, wherein the primary frequency resource includes a primary component carrier, and the one or more non-primary frequency resources include one or more non-primary component carriers.

8. The terminal of claim 5, wherein the specific time period is configured per non-primary frequency resource.

* * * * *